United States Patent Office 3,009,183
Patented Nov. 21, 1961

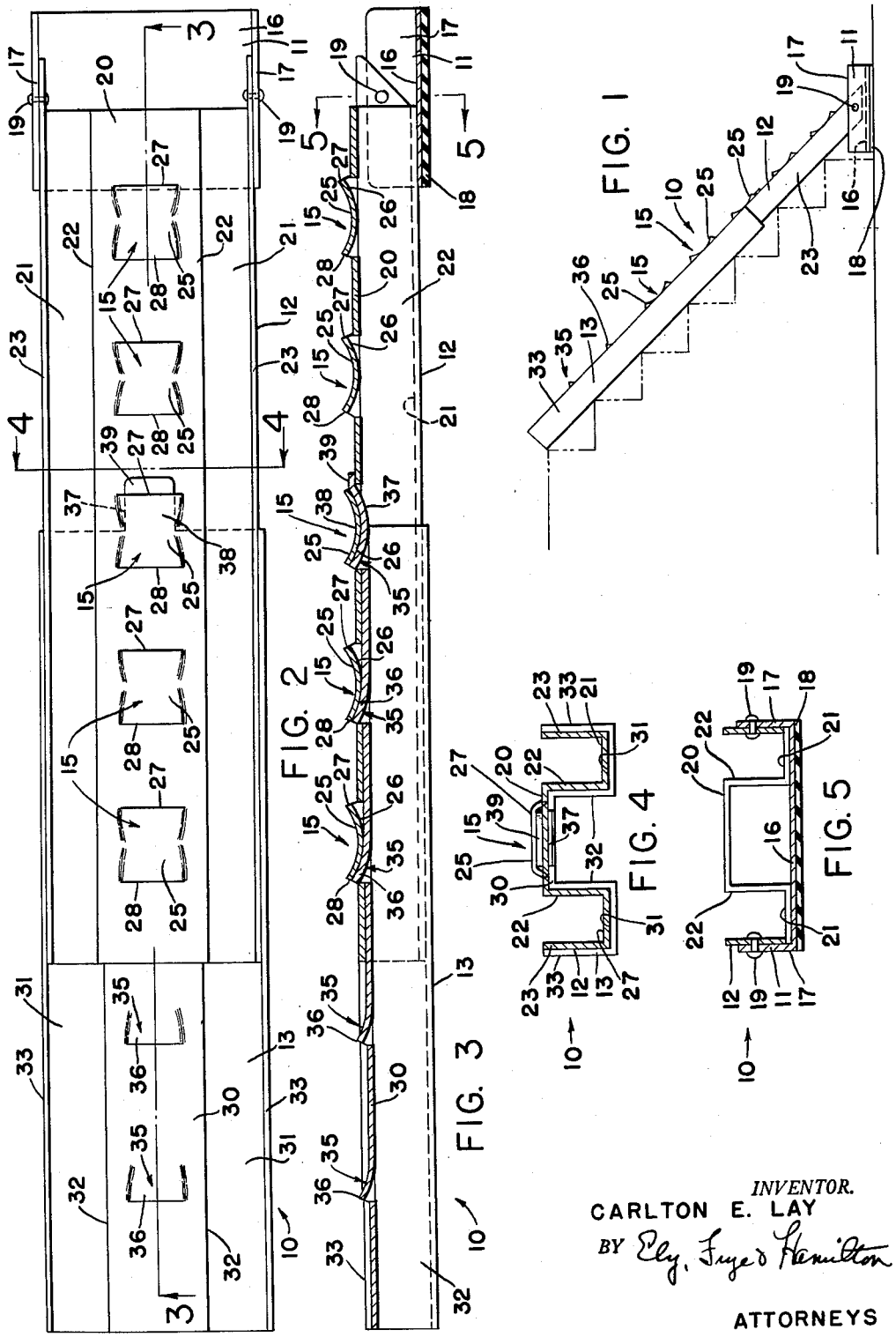

3,009,183
VARIABLE LENGTH PORTABLE RAMP
Carlton E. Lay, 158 Edgehill Drive, Akron, Ohio
Filed Feb. 28, 1956, Ser. No. 568,286
2 Claims. (Cl. 14—72)

The present invention relates to a variable length ramp. More particularly, the invention relates to a ramp structure including at least two sections which may be extensibly connected together and laid on a flight of stairs, to provide a means for transporting wheeled machines, such as heavy duty floor polishers, waxing machines, etc., between floors of a building.

It is an object of my invention to provide an improved variable length ramp which is easily adjusted and positioned, is light in weight and portable, and is strong and particularly suitable for use in transporting wheeled machines between floors of a building.

It is another object to provide a ramp having two sections which are extensibly joined together in such a manner that there is provided a series of safety stops or rests, along the length of the ramp, which may be used to temporarily support a wheeled machine being moved upon the ramp.

These and other objects will be apparent in view of the following detailed description of the invention considered with the attached drawing, in which a preferred embodiment of the invention is shown by way of example. Various modifications and changes in details of construction are comprehended within the scope of the appended claims.

In the drawing:

FIG. 1 is a view in side elevation, showing the improved ramp in position over a flight of stairs;

FIG. 2 is a plan view of the ramp;

FIG. 3 is a longitudinal section taken substantially on line 3—3 of FIG. 2;

FIG. 4 is a transverse section taken substantially on line 4—4 of FIG. 2; and

FIG. 5 is a transverse section taken substantially on line 5—5 of FIG. 3.

The variable length ramp structure provides a dual trackway for transporting wheeled machines from one elevation to another and is indicated generally by the numeral 10. The ramp includes a base member 11, a lower ramp member 12 pivotally attached to the base, and an upper ramp member 13, fitting telescopically on the lower member and interlocking therewith at various predetermined positions to provide a ramp of variable length. The several interlocking means by which the two ramp sections are engaged and positioned are each indicated generally by the numeral 15 and will be described in detail below.

As best shown in FIG. 5, the base member 11 is generally channel-shaped having a horizontal base plate 16 and opposed vertical side flanges 17. Attached to the underside of the base plate is a non-skid rubber layer 18. The ramp member 12 is preferably pivotally attached to the flanges 17 by rivets 19, or other suitable means.

The ramp members 12 and 13, are preferably each about eight feet long, though they could be of any length required, as determined by the length of a flight of stairs such as shown, in broken lines, in FIG. 1. Each member 12 and 13 is formed, preferably by stamping, from structural grade aluminum sheet, and is generally of channel cross section, member 12 being adapted to fit within member 13. Other metals, including steel, could also be used though aluminum is preferred because of its high strength/weight ratio.

The lower ramp member 12 has a rib-like longitudinal reentrant center portion 20 and identical longitudinal tracks, channels or grooves 21 on opposite sides thereof, preferably formed by the side walls 22 of the center portion, and the identical longitudinal side flanges 23. The width of the center portion 20 is preferably from 4 to 6 inches so that the grooves 21, each preferably 2 to 4 inches in width, will accommodate a wheeled machine (not shown), such as a floor polisher, having a wheel base width of 8 to 10 inches. It will be apparent, however, that a width of the ramp may be chosen which will accommodate wheeled machines having other wheel base widths.

The center portion 20 of the ramp member 12 is so formed, preferably by stamping, as to provide at spaced intervals, preferably 6 to 8 inches, a series of integral dished transverse flanges 25 which constitute the upper members of the ramp engaging and positioning means 15. As best shown in FIG. 3, each flange 25 is struck from the center portion 20 and so formed as to have a generally convex lower surface 26 with upper and lower outturned lips 27 and 28 oppositely directed toward and away from the base member 11, respectively.

The upper ramp member 13 also has a rib-like longitudinal center reentrant portion 30, which will slidably fit against the underside of the center portion 20 of the ramp member 12. Identical longitudinal tracks, channels or grooves 31 on opposite sides thereof, preferably formed by the sidewalls 32 of the center portion and the identical longitudinal side flanges 33, slidably fit against the underside of the grooves 21 of the ramp member 12.

The center portion 30 of the ramp member 13 is also so formed as to provide at spaced intervals, a series of transverse flanges 35, spaced correspondingly to flanges 25 of member 12, which constitute the lower members of the ramp engaging and positioning means 15. However, as best shown in FIG. 3, the flanges 35 each have only one upwardly directed outturned lip 36, which faces away from the base member.

Extending outwardly from the middle of the center portion 30 of the upper ramp member at the lower end thereof, toward the base member 11, is a stub projection or tongue 37 having an upper concave surface 38, conforming generally to the surface 26 of a flange 25, and a lip portion 39 which extends outwardly beneath a lip 27 and on top of the central portion 20 when the ramp is placed in position.

The ramp 10 is used as follows:

The base 11 is placed on the floor adjacent a flight of stairs. The lower member 12, pivoting on rivets 19, is positioned up the stairs. The upper member 13 is then placed beneath the member 12 with the upper end of member 12 overlapping the lower end of member 13. When the top of member 13 is on approximately the same level as the higher floor, or highest stair tread as the case may be, the tongue 37 is inserted beneath the nearest lip 27 on a flange 25. The lip 39 thus will prevent the ramp members 12 and 13 from being displaced apart in a lateral direction, and also prevent member 13 from moving downwardly on member 12. When the concave upper surface 38 on the tongue 37 is in substantially continuous radial contact with the convex lower surface 26 of a flange 25, each lip 28 of several flanges 25 will similarly conform to and interlock with a lip 36 of a flange 35, thus preventing downward movement of ramp member 13. As is apparent, the total number of interlocking contacts made between the flanges 25 and 35 will be dependent upon the length to which the ramp 10 is extended. However, one interlocking contact between a flange 25 and a flange 35 will suffice to prevent the ramp members 12 and 13 from being displaced apart in a longitudinal direction.

It is also apparent that the upper outturned lips 28 of each flange 25 will provide stops or projections against which the under carriage of a wheeled machine being transported along the ramp may be engaged, either up or down, if the individual using the ramp desires to take a brief rest.

What is claimed is:

1. A dual track ramp for transporting wheeled machines from one elevation to another, comprising, a base, a lower ramp member extending upwardly from said base, and an upper ramp member fitting telescopically on said lower member and interlocking therewith to provide a ramp of variable length, said lower ramp member having a rib-like reentrant center portion, longitudinal channels on opposite sides of said center portion, and a spaced series of integral flanges on said center portion, each of said flanges being struck from the center portion and having a generally convex lower surface with outturned lips oppositely directed toward and away from said base, the upper of each of said flange outturned lips providing a stop against which the undercarriage of a wheeled machine being transported on said ramp may be engaged, said upper ramp member having a center portion nesting within the center portion of said lower ramp member, longitudinal channels on opposite sides of said center portion, a series of integral flanges on said center portion spaced correspondingly to the flanges on said lower ramp member, each of said flanges being struck from the center portion and having an outturned lip directed away from said base, at least two of these said flanges engaging the correspondingly spaced flanges on said lower ramp member, and a projecting tongue at the end of said center portion directed toward said base and inserted beneath one of the flanges on said lower ramp member.

2. A dual track ramp for transporting wheeled machines from one elevation to another, comprising, a base, a lower ramp member extending upwardly from said base, and an upper ramp member fitting telescopically on said lower member and interlocking therewith to provide a ramp of variable length, said lower ramp member having a rib-like reentrant center portion, longitudinal tracks on opposite sides of said center portion, and a spaced series of integral flanges on said center portion, each of said flanges being struck from the center portion and having a generally convex lower surface with outturned lips oppositely directed toward and away from said base, the upper of each of said flange outturned lips providing a stop against which the undercarriage of a wheeled machine being transported on said ramp may be engaged, said upper ramp member having a center portion nesting within the center portion of said lower ramp member, longitudinal tracks on opposite sides of said center portion, a series of integral flanges on said center portion spaced correspondingly to the flanges on said lower ramp member, each of said flanges being struck from the center portion and having an outturned lip directed away from said base, at least two of these said flanges engaging the correspondingly spaced flanges on said lower ramp member, and a projecting tongue at the end of said center portion directed toward said base and having a generally concave upper surface terminating in a lip inserted over the center portion of said lower ramp member.

References Cited in the file of this patent

UNITED STATES PATENTS

| | | |
|---|---|---|
| 981,613 | Carter | Jan. 17, 1911 |
| 1,455,293 | Kolling et al. | May 15, 1923 |
| 1,793,035 | Whitney | Feb. 17, 1931 |
| 2,190,004 | Baker | Feb. 13, 1940 |
| 2,242,263 | Regenhardt | May 20, 1941 |
| 2,295,893 | Detrich | Sept. 15, 1942 |
| 2,658,241 | Houghton et al. | Nov. 10, 1953 |

FOREIGN PATENTS

| | | |
|---|---|---|
| 516,106 | Great Britain | Dec. 21, 1939 |